(12) United States Patent
Van Gestel et al.

(10) Patent No.: US 7,376,067 B2
(45) Date of Patent: May 20, 2008

(54) ALLOCATION OF REAL TIME FILES (75) Inventors: Wilhelmus Jacobus Van Gestel, Eindhoven (NL); Steven Broeils Luitjens, Eindhoven (NL); Kaoru Murase, Kadoma (JP); Yoshiho Gotoh, Kadoma (JP); Miyuki Sasaki, Kadoma (JP); Masanobu Nakamura, Shinagawa-ku (JP); Motoki Kato, Shinagawa-ku (JP)

(73) Assignee: Koninklijke Philips Electronics N.V., Eindhoven (NL)

( * ) Notice: Subject to any disclaimer, the term of this patent is extended or adjusted under 35 U.S.C. 154(b) by 772 days.

(21) Appl. No.: 10/498,761

(22) PCT Filed: Dec. 16, 2002

(86) PCT No.: PCT/IB02/05476

§ 371 (c)(1),
(2), (4) Date: Jun. 15, 2004

(87) PCT Pub. No.: WO03/054870

PCT Pub. Date: Jul. 3, 2003

(65) Prior Publication Data

US 2005/0105420 A1    May 19, 2005

(30) Foreign Application Priority Data

Dec. 20, 2001  (EP) ................... 01205016

(51) Int. Cl.
*G11B 7/007* (2006.01)
(52) U.S. Cl. .......................................... 369/100; 711/4
(58) Field of Classification Search ................ 369/100; 711/4
See application file for complete search history.

(56) References Cited

U.S. PATENT DOCUMENTS

| 5,805,547 | A  | * | 9/1998 | Yamamuro ............... 369/53.21 |
| 6,118,924 | A  | * | 9/2000 | Nakatani et al. ............... 386/70 |
| 6,571,309 | B2 | * | 5/2003 | Ando et al. ..................... 711/4 |
| 6,594,224 | B2 | * | 7/2003 | Muramatsu et al. ...... 369/275.4 |
| 6,718,436 | B2 | * | 4/2004 | Kim et al. ................... 711/114 |
| 7,016,599 | B2 | * | 3/2006 | Van Gestel et al. ........... 386/95 |

* cited by examiner

*Primary Examiner*—Gautam R. Patel
(74) *Attorney, Agent, or Firm*—Michael E. Belk (57) ABSTRACT

When recording data on a medium where a certain data rate is required, an allocation manager in the player must allocate sections of the logical space in such a way that the recording medium is efficiently filled and that an adequate data rate can be guaranteed even in the presence of defective ECC blocks. The allocation rules for the allocation manager are complex. The rules can be simplified by placing a lower limit on the size of an extent and by increasing the size of the extent depending on the number of defect ECC blocks in the extent.

28 Claims, 4 Drawing Sheets

ALLOCATION OF REAL TIME FILES

This invention relates to a method for allocation management of a recording medium having at least one record track and having a recording area divided into fragments for recording an extent, each fragment having a fixed size of an integer number of ECC-blocks, a begin and an end, and the extent having a minimum size and a begin and an end and to an apparatus using such method for allocation management and to a recording medium for use with such an allocation management.

The recording medium may be, for example, a magnetic or optical recording medium. The present invention typically and particularly though not exclusively relates to recording on an optical disc and will therefore be elucidated with reference to this example of use. The recording area of the recording medium, consisting of a logical space, which in turn consists of ECC-blocks, can be divided with a grid, where the grid size is called a fragment.

The information to be recorded consists of extents where the data of the extent is to be recorded in ECC-blocks. These ECC-blocks are allocated by an allocation manager.

This allocation manager allocates the ECC-blocks according to allocation rules.

In WO99/48095 the allocation manager uses rules for the allocation of ECC-blocks that require that a block of data written in a fragment of the recording medium must have a size between ⅔ and 1 times the fragment size and that the block of data is written in contiguous numbered ECC blocks. This size restriction is calculated for the worst case situation which occurs during simultaneous recording and play-back, but it can also be applied to recording or playback of a single stream. The presence of defective ECC blocks in the fragment prohibit to use the fragment for allocation of data. This results in the loss in playing time, complete fragments are unused if only a few ECC blocks are defective.

Such an allocation manager has the disadvantage that for certain extent sizes would violate the allocation rules. For instance an extent that has a size of 1.5 fragments it is not possible to use two subsequent fragments when starting the recording at the beginning of the first fragment because only 50% of the second fragment would be filled with data which is not allowed by the allocation rule of WO99/48095 which requires that fragments are at least 66.6% filled.

The allocation manager could decide to split the extent equally over the two fragments, resulting in 75% of both fragments being filled with data. This however results in a complicated allocation manager.

It is an objective of the present invention to provide a less complex allocation manager.

To achieve this objective the recording medium according to this invention is characterized in that the fixed size of the fragment equals the minimum size of the extent.

By choosing the size of the fragments to be the minimum size of an extent assures that an extent can be formed, in particular an extent with exactly the minimum size, that will fit in the fragment. This guarantees that there will be extents for which the fragment can be used, which makes allocation a simpler process for the allocation manager.

It also puts less stringent requirements on the size of extents since any size above the minimum size is acceptable. Furthermore the size of an extent can be simply increased without the allocation manager having to take into consideration rules regarding the minimum percentage filling of a fragment. This is because the minimum size of the extent is sufficient to guarantee the required data rate for the recording or playback of video or audio, because a sufficient amount of data is made available even in the presence of a certain number of skipped ECC-blocks in the extent.

A further embodiment of the invention is characterized in that the begin of the extent is aligned with the begin of the fragment and that the end of the extent is aligned with the end of a fragment.

If the recording is deleted then in the next recording the free space which is an integer number of fragments is large enough for a new extent. In this way no loss in playing time occurs due to free space with a size less than the minimum size of an extent.

This allows the allocation manager to select the beginning of a fragment as the beginning of an extent. The allocation manager does no longer have to consider splitting an extent over two fragments by starting the recording of an extent somewhere in the fragment.

A further embodiment of the invention is characterized in that the extent can comprise a number of allowable defective ECC blocks and that the minimum size of the extent is determined based on the number of allowable defective ECC blocks.

When the extent is written and ECC-blocks with defective ECC blocks are encountered these defective ECC-blocks will be skipped since they cannot be used and the extent will continue in the next available ECC-block. In order to ensure an adequate data rate the number of skips in an extent for a certain amount of data must be limited and thus the number of defective ECC-blocks for a certain amount of data must be limited. A solution to keep the number of skips for a certain amount of data within limits the size of the extent must be increased based on the number of defective ECC-blocks. This effectively increases the amount of error free data, reducing the number of skipped ECC-blocks relative to the number of used ECC-blocks. This guarantees an adequate data rate and results in a simple allocation manager and reduces loss in playing time.

A further embodiment of the invention is characterized in the number of allowable defective ECC blocks are comprised in a section of a fragment where the section is the only section in that fragment that is comprised in the extent.

By only looking at that section of one fragment which is comprised in an extent to determine the amount of defective ECC blocks results in an efficient way to determine whether the number of defective ECC blocks encountered is sufficiently low in that fragment to be used for recording. When an extent comprises a section of a fragment the amount of defective ECC blocks and the actions taken based on the amount of defective ECC blocks is based only on that section. The rest of the fragment is not taken into account for this purpose. A burst of defective ECC blocks at the end of a first fragment and another burst of defective ECC blocks at the beginning of a second subsequent fragment is allowed since the determination of the number of defective ECC blocks is restricted to within a fragment.

A further embodiment of the invention is characterized in that the number of allowable defective ECC blocks are comprised in a sliding window between the begin and the end of the extent.

By using a sliding window to determine whether the amount of defective ECC blocks is sufficiently low for the ECC-blocks in the sliding window to be allocated, the size of the extent can be reduced compared to when the number of defective ECC blocks is determined between the beginning and the end of a fragment. Because the sliding window ignores the virtual fragment boundaries, no reservations have to be made for potential defective ECC blocks in the next fragment when defective ECC blocks are found in the end of a fragment. This places more restrictions on the error patterns, which results in a smaller extent.

A smaller extent allows the allocation manager more freedom when determining where to store the extent and thus a simpler implementation of the allocation manager and a more efficient use of the logical space on the recording medium.

A further embodiment of the invention is characterized in that the number of allowable defective ECC blocks in concatenated extents are comprised in a sliding window between a begin and an end of the concatenated extents.

By using a sliding window that slides through the entire concatenated extent to determine whether the amount of defective ECC blocks is sufficiently low for the ECC-blocks in the sliding window to be allocated, the size of the extent can be reduced compared to when the number of defective ECC blocks is determined with a sliding window within an extent. Because the sliding window ignores the extent boundaries, no reservations have to be made for potential defective ECC blocks in the next extent when defective ECC blocks are found in the end of an extent. This places more restrictions on the error patterns, which results in a smaller extent.

A smaller extent allows the allocation manager more freedom when determining where to store the extent and thus a simpler implementation of the allocation manager and a more efficient use of the logical space on the recording medium.

A further embodiment of the invention is characterized in that the integer number of ECC-blocks in an extent with the minimum size can be divided by 3 and by 8.

The allocation manager can be very efficiently implemented by using one bit to indicate the availability of a ECC-block. The number of bits in a byte is 8. It is thus most efficient to use a number of ECC-blocks that is a multiple of 8. Furthermore since units of 3 ECC-blocks are being used to align the DVR Aligned Units with the ECC blocks the extent is preferably a multiple of 3, thus ensuring that an integer multiple of DVR aligned units fit in an extent. By ensuring that the number of ECC-blocks is dividable by 3 and by 8 the allocation manager can handle bytes at a time and does not have to consider whether a DVR aligned unit is potentially split across two extents.

A further embodiment of the invention is characterized in that the minimum size of the extent is 192 ECC-blocks.

An efficient choice for the minimum size of the extent is 192 blocks, which is a multiple of 3 and of 8. 192 is the minimum size, given the parameters of DVR, which allows defects in an extent or fragment while still obtaining a sufficient data rate.

A further embodiment of the invention is characterized in that the number of small burst of defective ECC blocks in a window sliding over the extent is less than 4 and in that the number of defective ECC blocks in a burst error is less than 5.

By limiting the number of burst of defective ECC blocks to 3 the number of skips in the extent is also limited which improves the obtainable data rate and prevents the loss of playing time.

A further embodiment of the invention is characterized in that the number of small burst of defective ECC blocks in a section of a fragment is less than 4 and in that the number of defective ECC blocks in a burst error is less than 4.

By limiting the number of defective ECC blocks in a burst to 3 the number of skips in the extent is also limited which improves the obtainable data rate and yet allows fragments with defective ECC blocks to be used so preventing the loss of playing time.

If the allocation manager is to be kept simple it is advantageous to predetermine the minimum size of an extent using a worst case model of the recording and playback system. The allocation manager then bases the allocation of extents on extents equal to or larger than this predetermined minimum size. The allocation manager receives information from the file system database about already occupied areas of the logical space and about the locations of defect ECC blocks. The allocation manager then analyses a section of the logical space that is still free and determines whether there are bursts of defect ECC blocks that exceed the allowable number of defect ECC blocks. The remaining sections of logical space between the unacceptable bursts of defect ECC blocks are then examined whether these sections are equal to or larger than the predetermined minimum size of an extent. The remaining sections of logical space between the unacceptable bursts of defect ECC blocks with a size equal to or larger than the minimum size of an extent can then be allocated by the allocation manager, while sections with a size smaller than the minimum size of an extent cannot be allocated.

As long as the defect ECC blocks remain defect the sections of logical space between the unacceptable bursts of defect ECC blocks with a size smaller than the minimum size of an extent can never be used for allocation and are thus lost for recording, reducing the playing time of the recording medium. It is therefore important that the minimum size of an extent is chosen to be as small as possible because this increases the chance that an extent with the minimum size can fit between two unacceptable bursts of defect ECC blocks. The minimum size of an extent is further dependent on the required data rate since the extra jumps caused by smaller extents decrease the available data rate for recording and playback.

A more optimal use of the recording medium can be obtained when sacrificing the simplicity of the allocation manager. By dynamically taking into consideration the actual parameters of the player, the recording medium and the actual defect ECC blocks encountered the length of an extent to be recorded can be reduced or increased within wider margins.

In contrast, if using a model to predetermine the minimum size of an extent an assumption is made about the amount of defective ECC blocks allowed in an extent. If fewer defective ECC blocks are actually present then allocation manager still allocates at least a section of the logical space with the size of the minimum size of an extent.

The invention will now be described with reference to the drawings.

Figure 1:
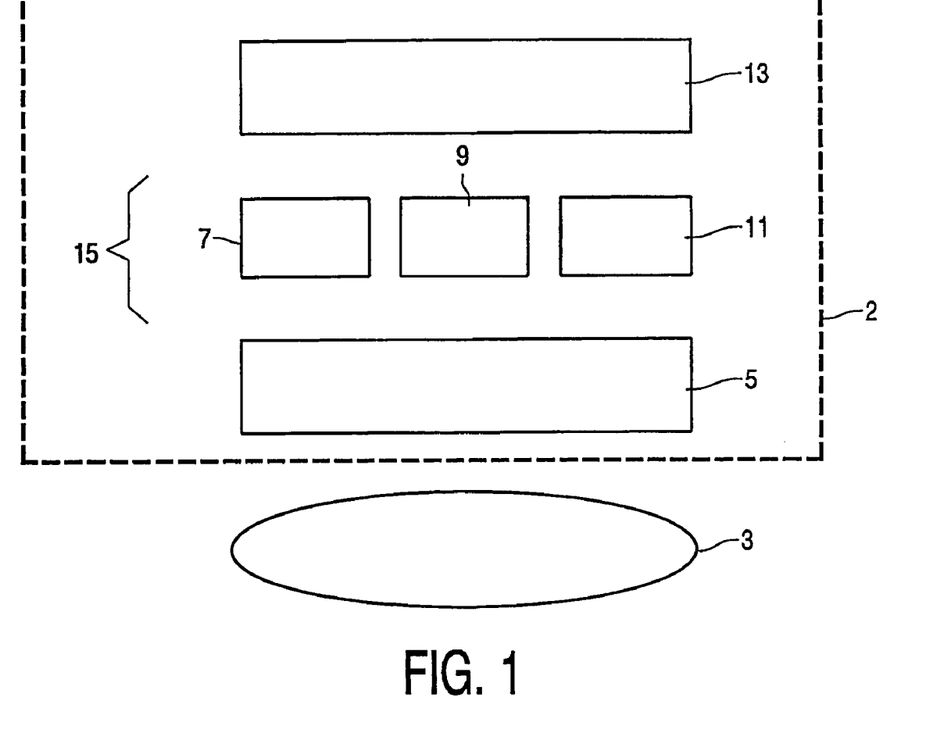
FIG. 1 shows a apparatus for recording data on the recording medium and for reading data from the recording medium.

In FIG. 1 an apparatus for recording and playing back the recording medium is shown.

It comprises a basic engine 5, a file system layer 15, and an application layer 13. The basic engine 5 processes the data going to the recording medium 3 and coming from the recording medium 3 according to instructions received from the file system layer 15. The basic engine 5 further provides information about the occurrence of defective ECC blocks. The basic engine 5 has no further knowledge about the data it processes.

The file system layer 15 comprises a scheduler 7, an allocation manager 9 and a file system database 11. The scheduler 7 determines when each data block must be written respectively and be read in order to be able to receive from the application layer 13 respectively and to provide to the application layer 13 a data stream with appropriate data rate. The file system data base 11 provides information on where data was written on the recording medium 3, i.e. where the data is located on the recording medium 3. This information is used during the retrieval of data from the recording medium 3, but it is also used by the allocation manager 9 to determine where no data has been written yet, i.e. which sections of the recording medium 3 are still available for allocation. The file system data base 11 also contains information about known bad sections on the recording medium 3. The allocation manager 9 uses this information about defect ECC blocks to determine whether an extent can be stored in such a way that the maximum number of allowable defect ECC blocks is not exceeded. If the maximum number of allowable defect ECC blocks would be exceeded the allocation manager can try to form one or more smaller extents out of the remaining logical space between defects if the remaining logical space between defects is larger than the minimum size of an extent.

Figure 2:
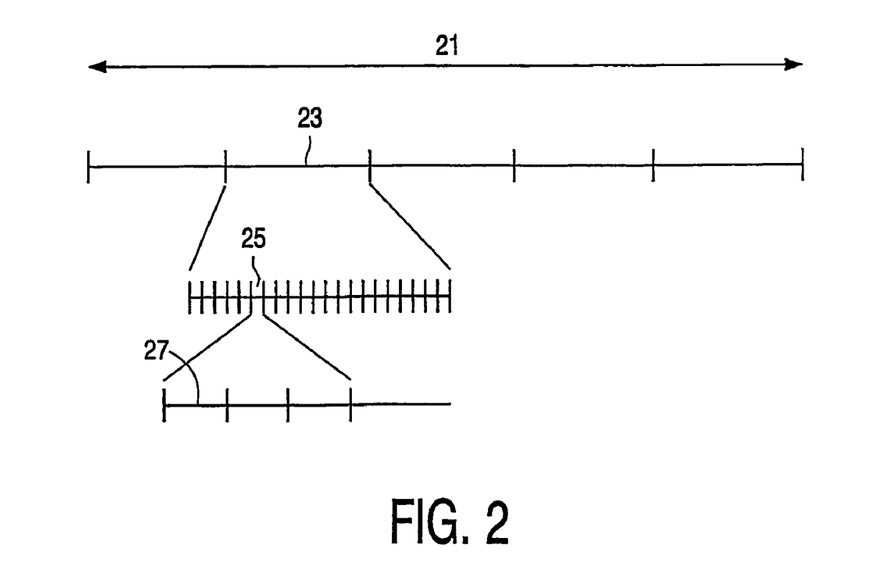
FIG. 2 shows a track of the recording medium.

FIG. 2 shows a track of the recording medium.

The logical space 21 comprises fragments 23, resulting from the division of the logical space into equal sized sections. Fragments 23 are defined as consisting of a number of ECC blocks 25. Each ECC block 25 comprises logical blocks 27.

Figure 3:
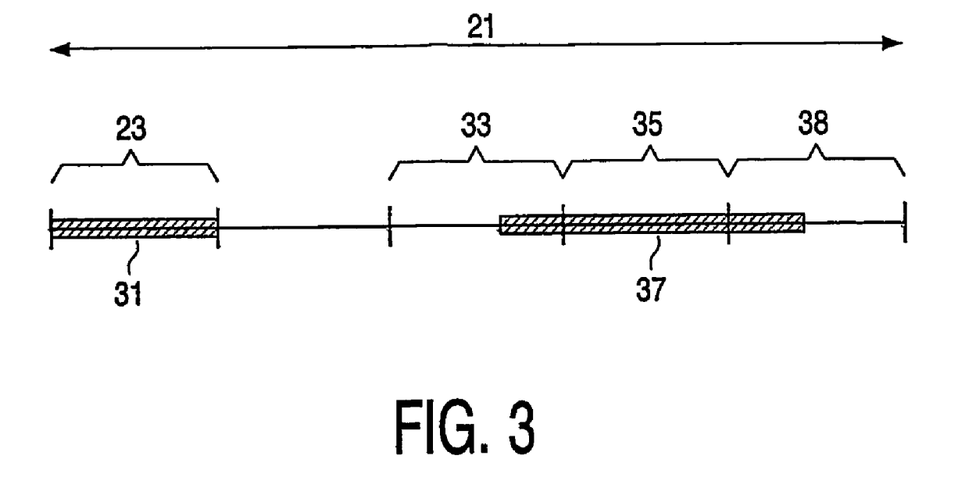
FIG. 3 shows the allocation of fragments to an extent on the recording medium.

FIG. 3 shows the allocation of fragments to an extent on the recording medium.

The data to be written to the recording medium 3 is recorded in one or more extents 31, 37. FIG. 3 shows two types of extents. The first extent 31 to be discussed is an extent with a minimum size. No smaller extents are allowed by the allocation manager 9. The size of the fragment 23 is chosen to be equal to the minimum size of an extent which in this case is equal to the size of the first extent 31 in FIG. 3. The allocation manager allocates fragments to extents, i.e. the smallest section of the logical space that can be allocated to an extent is one fragment 23. This reduces the complexity of the allocation manager because an extent 31 with the minimum size will always fit in a fragment and since a fragment is either already allocated or still available the allocation manager does not have to consider whether the extent will fit in a fragment that is available.

The extent 37 has a size larger than the minimum size of an extent more than one fragment 33, 35, 38 is needed to store the extent 37. The allocation manager now allocates at least two fragments 33, 35, 38 of which at least one fragment 33, 38 is only partially filled. The extent 37 in FIG. 3 is recorded in 3 fragments 33, 35, 38 of which only one fragment 35 is completely filled.

A further reduction of the complexity of the allocation manager is achieved by aligning the beginning of an extent with the beginning of a fragment. This reduces the complexity of the allocation manager since no decisions on where to start recording in a fragment need to be taken. In FIG. 3 the beginning of the first extent 31 is aligned with the beginning of the fragment 23.

Another reduction of the complexity of the allocation manager is achieved by aligning the end of an extent with the end of a fragment. Together with the alignment of the beginning of the extent 31 with the beginning of a fragment 23 this results in an extent 31 with a size limited to an integer number of fragments. This reduces the complexity of the allocation manager because when the extent 31 is erased an integer number of fragments 23 are being made available for allocation again. Since a fragment can hold an extent with the minimum size the allocation manager only needs to deal with complete fragments and does not have to consider partially filled fragments. Further more each fragment that is made available again can store an extent with the minimum size.

Figure 4:
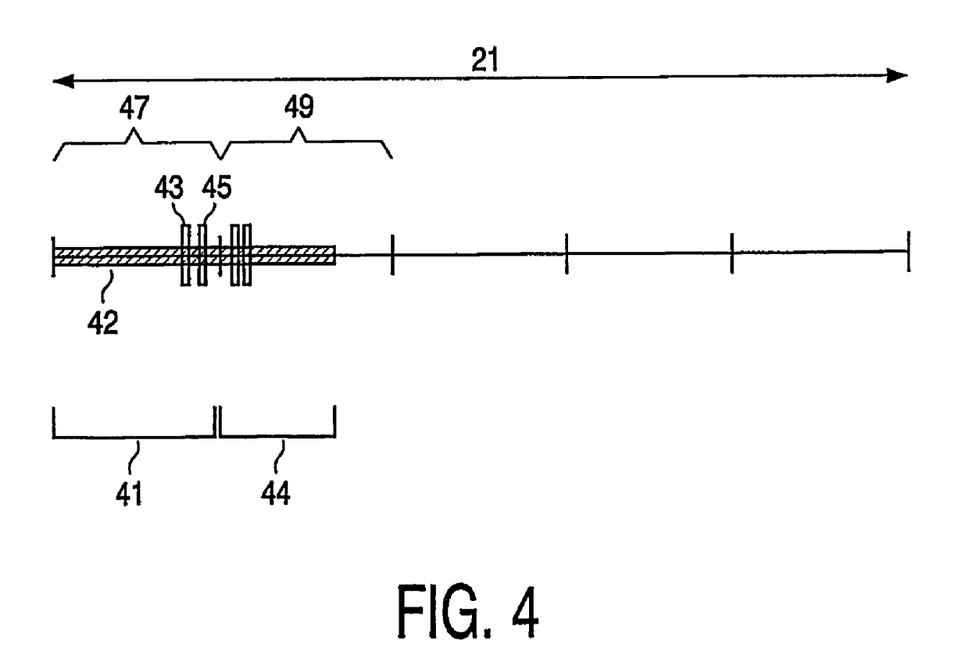
FIG. 4 shows an extent where the allowable defective ECC blocks are comprised in a section of a fragment where the section is the only section in that fragment that is comprised in the extent between the begin and the end of a fragment.

FIG. 4 shows an extent where the defective ECC blocks are comprised between the begin and the end of a fragment. In the logical space 21 an extent 42 is stored in two subsequent fragments 47, 49.

The first fragment 47 comprises two ECC-blocks 43, 45 with defective ECC blocks. These ECC-blocks 43, 45 cannot be used and must be skipped during recording and playback. In order to use the fragment comprising the defective ECC blocks the number of defective ECC blocks must be limited, otherwise the skipping of the defective ECC blocks would lead to a reduction in the data rate with which the data can be provided to the application layer. If the number of defective ECC blocks in a fragment exceeds a predetermined limit the entire fragment will not be used for recording. An entry in the file system data base indicates to the allocation manager that a fragment contains too many defective ECC blocks and can no longer be used.

The number of defective ECC blocks is determined for each fragment, which is very efficient because only the data in a fragment itself needs to be considered. For this purpose a window 41, 44 can be used that has the same size as the total data belonging to an extent stored in a fragment. If the data of an extent 42 doesn't fill the entire fragment 49 but only a part of the fragment 49 the window 44 is reduced in size and is delimited by the extent 42 such that errors in the unused section of the fragment 49 are not considered.

Figure 5:
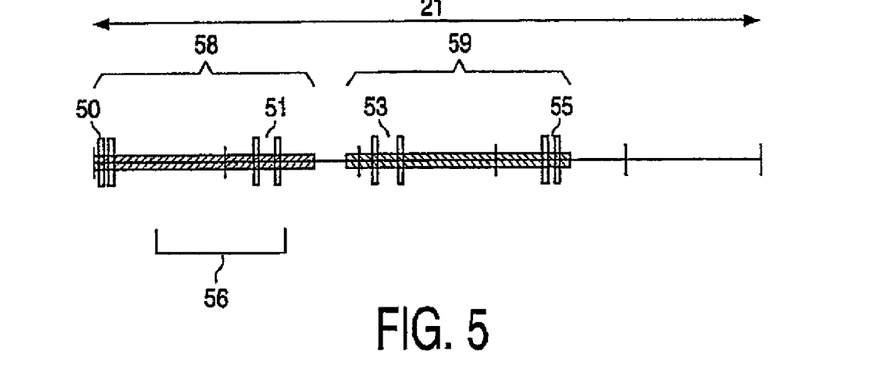
FIG. 5 shows a sliding window for determining the number of defective ECC blocks in an extent.

FIG. 5 shows a sliding window for determining the number of defective ECC blocks in an extent.

In the logical space 21 two extents 58, 59 are stored.

The first extent 58 comprises defective ECC blocks 50 near the beginning and defective ECC blocks 51 near the end of the extent. The second extent 59 comprises defective ECC blocks 53 near the beginning of the extent 59 and comprises defective ECC blocks 55 near the end of the extent 59. The window 56 is smaller than the extent 58, 59 and is restricted to an extent 58, 59. In order to comply with the maximum number of errors allowed inside the window the extent is only allowed to comprise defective ECC blocks 55 more than a window size distance away from the defective ECC blocks 53 near the beginning of the extent 59. This places further restrictions on the error patterns in the extents 58, 59. When the number of error patterns is restricted the size of the extent 58, 59 can be reduced.

When these extents 58, 59 are read skipping will occur of the defective ECC-blocks 50, 51, 53, 55. In order to determine whether the extent 58, 59 may be allocated the window 56 is used. This window 56 slides along the extent 58, 59 and the number of defective ECC blocks 50, 51, 53, 55 in the window 56 is determined. If the number of defective ECC blocks 50, 51, 53, 55 exceeds a predetermined value the extent 58, 59 can no longer be formed and the ECC blocks 50, 51, 53, 55 are marked as bad in the file system database. The allocation manager 9 can try to form one or more smaller extents out of the remaining logical space between the defects 50, 51, 53, 55 if the remaining logical space between the defects 50, 51, 53, 55 is larger than the minimum size of an extent.

The window 56 slides along the extent 58, 59 and the number of defective ECC blocks 50, 51, 53, 55 in the window 56 is determined. A higher number of defective ECC blocks can be tolerated by using a sliding window 56 compared to a window 41, 44 that is aligned with fragments and is not of the sliding type but is stepped from fragment to fragment as in FIG. 3.

Figure 6:
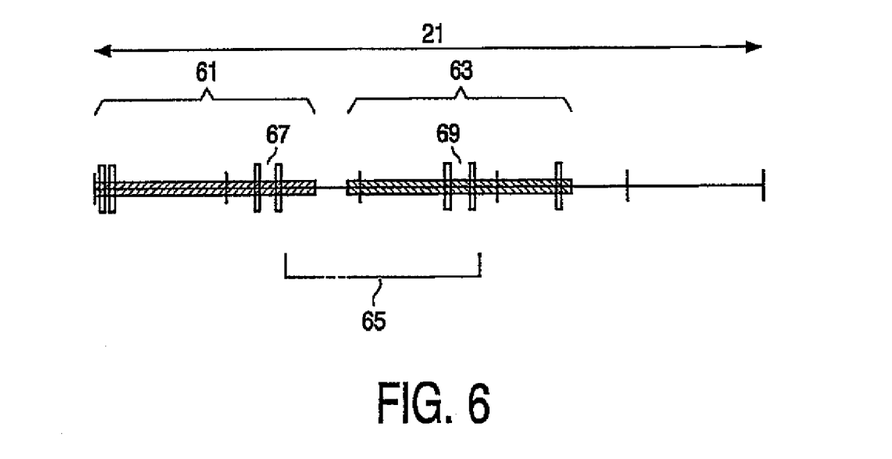
FIG. 6 shows a sliding window for determining the number of defective ECC blocks in concatenated extents.

FIG. 6 shows a sliding window for determining the number of defective ECC blocks in concatenated extents.

In the logical space 21 two extents 61, 63 are stored. The first extent 61 comprises defective ECC blocks 67 near the end of the extent. The second extent 63, in order to comply with the maximum number of defective ECC blocks allowed inside the window is not allowed to comprise defective ECC blocks near the beginning of the second extent 63 but is allowed to comprise defective ECC blocks 69 at a position such that the defective ECC blocks fall outside the window when the defective ECC blocks near the end of the first extent 61 are not comprised in the window 65 at the same time. This places further restrictions on the error patterns in the extents. When the number of error patterns is restricted the size of the extent can be reduced.

When this concatenated extent is read skipping will occur of the defective ECC-blocks. In order to determine whether a fragment may be allocated a window 65 is used. This window 65 slides along the concatenated extents 61, 63 and the number of defective ECC blocks in the window 65 is determined. If the number of defective ECC blocks exceeds a predetermined value the extent can no longer be formed and the ECC blocks are marked as bad in the file system database. The allocation manager can try to form one or more smaller extents out of the remaining logical space between the defects if the remaining logical space between the defects is larger than the minimum size of an extent.

Figure 7:
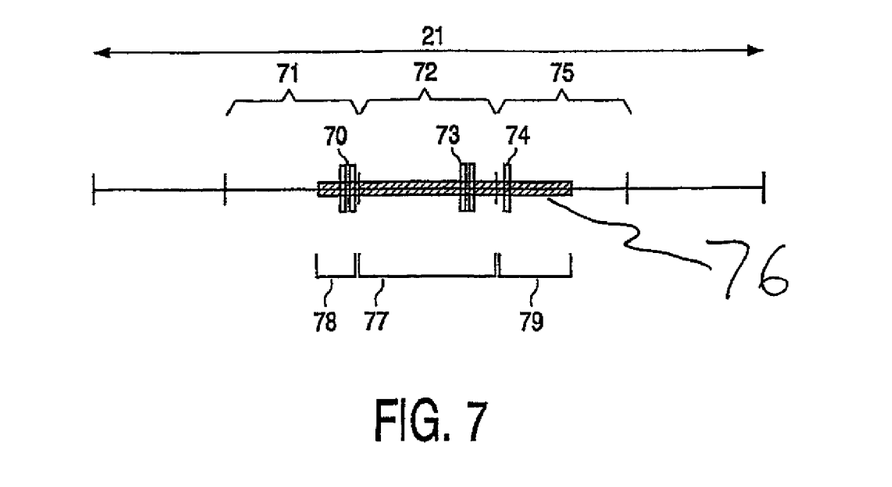
FIG. 7 shows the worst case situation when the allowable defective ECC blocks are comprised in a section of a fragment where the section is the only section in that fragment that is comprised in the extent between the begin and the end of a fragment.

FIG. 7 shows the worst case scenario when the detection of defective ECC blocks is limited to a fragment.

The logical space 21 is divided into equally sized virtual sections, i.e. fragments 71, 72, 75 and comprises an extent 76. The size of the extent 76 shown is larger than the size of a fragment 23. The extent 76 starts near the end of a first fragment 71, fill the subsequent second fragment 72, completely and end near the beginning of the third fragment 75.

The fragment comprises defective ECC blocks 70, 73, 74, as indicated. The first fragment 71 comprises defective ECC blocks 70 near the end, the second fragment 72 comprises defective ECC blocks 73, and the third fragment 75 comprises defective ECC 74 blocks near the beginning of the fragment 75. Three windows 77, 78, 79 are shown in FIG. 7. The first window 78 is smaller than a fragment because only the last part of the fragment 71 is filled with data. The second window has the size of the fragment 72 because the entire fragment 72 is filled with data. The third window 79 is smaller than a fragment because only the first part of the fragment 75 is filled with data. The location of the defective ECC blocks 70, 73, 74 as shown in FIG. 7 is a worst case assumption.

The size of the extent is given by:

$$\text{Fragment size} + 2*(Nd*Nb) + 2*Nd$$

Where Nd is the number of small burst defective ECC blocks, Nb is the length of the burst defective ECC blocks expressed in number of ECC blocks, (Nd*Nb) are the defective ECC blocks. Since a burst error is separated from another burst error by at least one non-defect ECC block Nd also equals the number of correct ECC blocks which separate the defective ECC blocks in the worst case situation.

The formula for calculating the number of ECC blocks X in the extent the following formula is used:

$$X = (Rm/8)(4*Tj + 6*N*Td)/(1 - (2*Rm/Ru))$$

Where Rm is (192/188)*Rmux, Tj is the access time, N=Nd*Nb i.e. the defective ECC blocks, Td is the time delay caused by a defect ECC block, Ru is the disc transfer rate and Td is the sum of time required to jump across all bursts in the extent.

When using the values typical for DVR:

Te=0.01457 sec Time needed to skip an ECC block
Ta=0.8 sec Access time, time to jump to another location
Ts=0.08359 sec Time needed to skip over a single ECC block and reading/writing cannot continue in 14.7 ms
Ru=36 Mbps Disc transfer rate
Rmux=10 Mbps Rate of the TS multiplex
Rm=(192/188)*RmuxRate of the multiplex if a 4 byte header is attached to the TS packets Some of the ECC blocks in an extent are in a different fragment so the number of correct ECC blocks in a fragment Xa can be calculated from the length of the extent X with the following formula:

$$Xa = X - 2*Nd$$

The minimum size of the extent can then be calculated:

$$Xs = Xa + N$$

This means that the minimum size of the extent is the size of the fragment plus the number of defective ECC blocks in the extent, i.e. the size of the extent is increased by the amount of defective ECC blocks in the fragment.

When calculating the minimum size of the extent for various combinations of Nb and Nd (the number of bursts of defective ECC blocks and the length of those burst of defective ECC blocks) the following table 1 of the values of the length of the extent X expressed in number of ECC blocks is obtained:

|    | Nd |  |  |  |  |  |
|----|--------|--------|--------|--------|--------|--------|
| Nb | 1 | 2 | 3 | 4 | 5 | 6 |
| 1  | 166.88 | 189.49 | 212.10 | 234.71 | 257.32 | 279.93 |
| 2  | 152.15 | 160.03 | 167.91 | 175.80 | 183.68 | 191.56 |
| 3  | 156.09 | 167.91 | 179.74 | 191.56 | 203.39 | 215.21 |
| 4  | 160.03 | 175.80 | 191.56 | 207.33 | 223.09 | 238.86 |

-continued

| | Nd | | | | | |
|---|---|---|---|---|---|---|
| Nb | 1 | 2 | 3 | 4 | 5 | 6 |
| 5 | 163.97 | 183.68 | 203.39 | 223.09 | 242.80 | 262.50 |
| 6 | 167.91 | 191.56 | 215.21 | 238.86 | 262.50 | 286.15 |

By choosing the minimum length of an extent to be 192 the combinations of Nd and Nb where the resulting values of X are shown in bold can be optimally read with a minimum amount of time lost due to skipping of the bad ECC blocks. Other combinations of Nb and Nd lead to a situation where an adequate data rate cannot be guaranteed.

Not shown in the table but it is clear that bursts with unequal length are also possible. 2 bursts with both 5 defects are allowed but also 2 bursts one with a length of 2 and the other with a length of 8 are allowed too.

Figure 8:
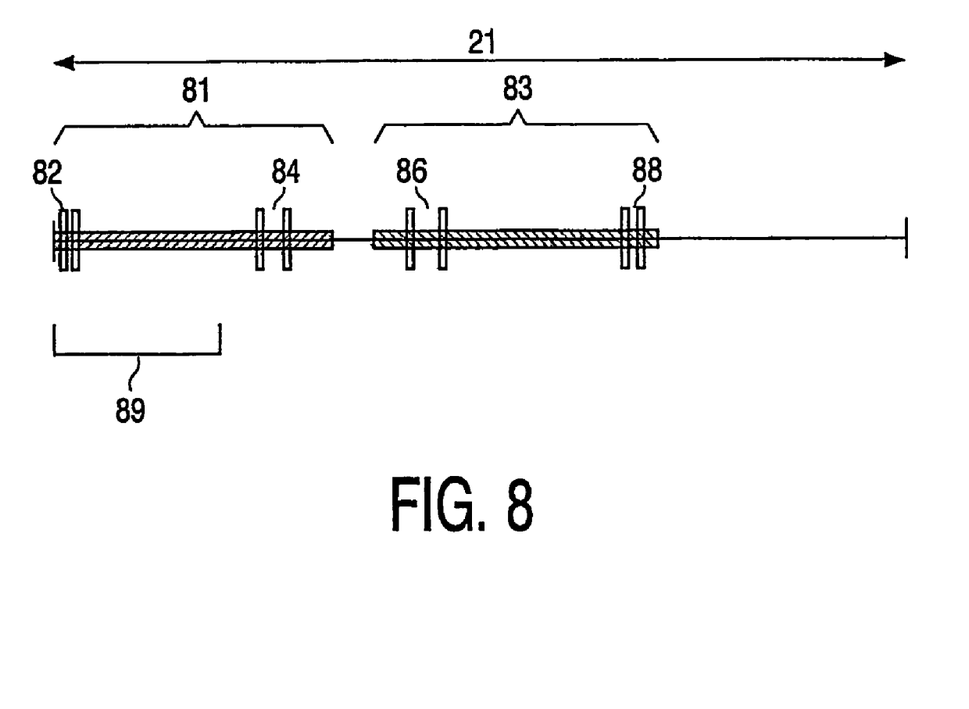
FIG. 8 shows the worst case situation when the number of defective ECC blocks is determined using a sliding window in an extent.

FIG. 8 shows the worst case scenario for extents which are larger than the minimum size of an extent and a sliding window is used to determine the amount of defective ECC blocks in the extent.

The window size of window 89 is chosen to be the minimum size of an extent. The period over which to average of the number of defective ECC blocks in the worst case situation is equal to the minimum extent size.

$X=(Rm/8)(4*Tj+4*N*Td)/(1-(2*Rm/Ru))$

Some of the ECC blocks in an extent are in a different fragment so the number of correct ECC blocks in a fragment Xa can be calculated from the length of the extent X with the following formula:

$Xa=X-Nd$

The minimum size of the extent can then be calculated:

$Xs=Xa+(Nd*Nb)$

When calculating the minimum size of the extent for various combinations of Nb and Nd (the number of bursts of defective ECC blocks and the length of those bursts of defective ECC blocks) the following table 2 of the values of the length of the extent X expressed in number of ECC blocks is obtained:

| | Nd | | | | | |
|---|---|---|---|---|---|---|
| Nb | 1 | 2 | 3 | 4 | 5 | 6 |
| 1 | 159.34 | 174.42 | 189.49 | 204.56 | 219.64 | 234.71 |
| 2 | 149.52 | 154.78 | 160.03 | 165.29 | 170.54 | 175.80 |
| 3 | 152.15 | 160.03 | 167.91 | 175.80 | 183.68 | 191.56 |
| 4 | 154.78 | 165.29 | 175.80 | 186.31 | 196.82 | 207.33 |
| 5 | 157.40 | 170.54 | 183.68 | 196.82 | 209.95 | 223.09 |
| 6 | 160.03 | 175.80 | 191.56 | 207.33 | 223.09 | 238.86 |

As can be seen from table 2 when choosing a minimum size of the extent Xs to be 192 leads to a larger set of combinations of Nd and Nb covered which leads to more of the logical space being acceptable for storing extents which in turn results in more available playing time on the recording medium. By choosing the minimum length of an extent to be 192 the combinations of Nd and Nb where the resulting values of X are shown in bold can be optimally read with a minimum amount of time lost due to skipping of the bad ECC blocks. Other combinations of Nb and Nd lead to a situation where an adequate data rate cannot be guaranteed.

Figure 9:
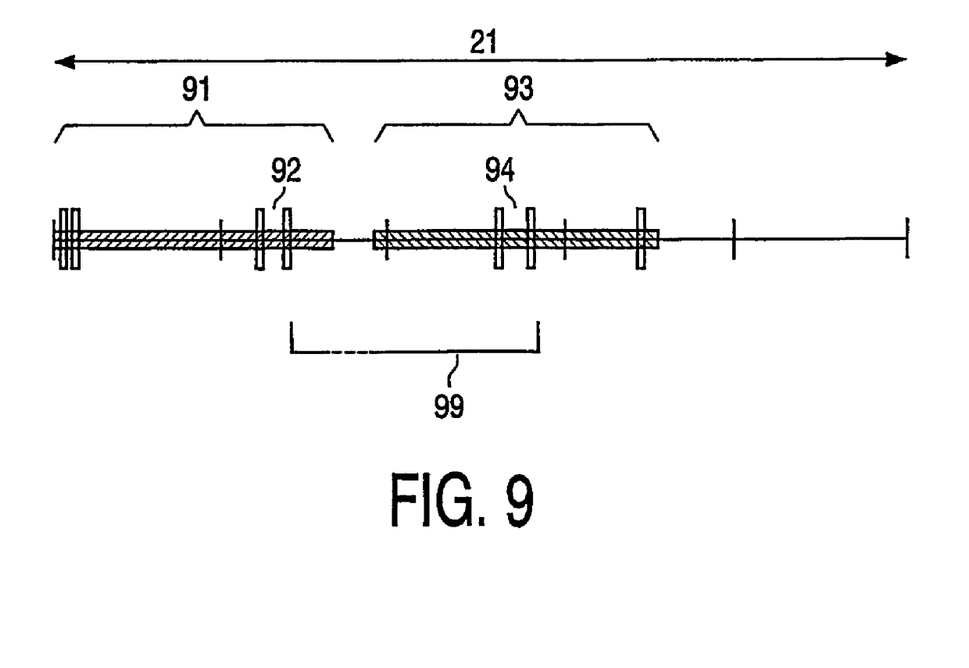
FIG. 9 shows the worst case situation when the number of defective ECC blocks is determined using a sliding window in concatenated extents.

FIG. 9 shows the worst case scenario for extents which are larger than the minimum size of an extent, where the extents are concatenated and where a sliding window is used to determine the amount of defective ECC blocks in the concatenated extents.

The window size is chosen to be the minimum size of an extent. The period over which to average of the number of defective ECC blocks in the worst case situation is equal to the minimum size of an extent.

$X=(Rm/8)(4*Tj+2*SUM(Ti))/(1-(2*Rm/Ru))$

SUM(Ti) is the total time to skip the defective ECC blocks in the window. In this way it is allowed to have bursts with different lengths and to combine a burst of defective ECC blocks with a first length with a burst of defective ECC blocks with a second length in the same window.

The minimum size of the extent can now be calculated:

$Xs=X+(Nd*Nb)$

When calculating the minimum size of the extent for various combinations of Nb and Nd (the number of bursts of defective ECC blocks and the length of those bursts of defective ECC blocks) the following table 3 of the values of the length of the extent X expressed in number of ECC blocks is obtained:

| | Nd | | | | | |
|---|---|---|---|---|---|---|
| Nb | 1 | 2 | 3 | 4 | 5 | 6 |
| 1 | 151.80 | 159.34 | 166.88 | 174.42 | 181.95 | 189.49 |
| 2 | 146.89 | 149.52 | 152.15 | 154.78 | 157.40 | 160.03 |
| 3 | 148.21 | 152.15 | 156.09 | 160.03 | 163.97 | 167.91 |
| 4 | 149.52 | 154.78 | 160.03 | 165.29 | 170.54 | 175.80 |
| 5 | 150.84 | 157.40 | 163.97 | 170.54 | 177.11 | 183.68 |
| 6 | 152.15 | 160.03 | 167.91 | 175.80 | 183.68 | 191.56 |

As can be seen from table 3 when choosing a minimum size of the extent Xs to be 192 leads to an even larger set of combinations of Nd and Nb covered which leads to more of the logical space being acceptable for storing extents which in turn results in more available playing time on the recording medium. By choosing the minimum length of an extent to be 192 the combinations of Nd and Nb where the resulting values of X are shown in bold can be optimally read with a minimum amount of time lost due to skipping of the bad ECC blocks. Other combinations of Nb and Nd lead to a situation where an adequate data rate cannot be guaranteed.

This table also shows that a more optimal use of the recording medium can be obtained when sacrificing the simplicity of the allocation manager. By dynamically taking into consideration the actual defect ECC blocks encountered the length of an extent to be recorded can be reduced or increased within wider margins. If in a section of the recording medium only one burst of defective ECC blocks with a length of two defect ECC blocks is encountered (Nd=1, Nb=2) the minimum size of this extent can be reduced from 192 to 146.89+1*2=148.89 or 149 ECC blocks. This means that while the data rate is still guaranteed, the dynamic determination of the minimum size of an extent the allocation manager can use more sections of the logical space which results in more playing time being available on the recording medium.

The models in FIGS. 7, 8 and 9 assume that simultaneous record and playback occurs. It is obvious that when simply ignoring either record or playback equivalent models can be obtained for single streams, i.e. situations where only a recording stream or a playback data stream is present and the apparatus 2 no longer needs to jump back and forth between writing and reading the data, thus reducing the amount of jumps substantially.

The invention claimed is:

1. A recording medium comprising:
   at least one record track; and
   a recording area divided into a first fragment and a second fragment for recording an extent, the first fragment and the second fragment each having a fixed size of an integer number of ECC-blocks, a fragment begin and a fragment end, and the extent having a minimum size and an extent begin and an extend end, wherein the fixed size equals the minimum size of the extent.

2. The recording medium according to claim 1, wherein the extent begin of the extent is aligned with the fragment begin and wherein the extent end of the extent is aligned with the fragment end.

3. The recording medium according to claim 1,
   wherein the extent comprises a number of allowable defective ECC blocks and wherein the minimum size of the extent is determined based on the number of allowable defective ECC blocks.

4. The recording medium according to claim 3,
   wherein the number of allowable defective ECC blocks is comprised in a section of a fragment where the section is the only section in that fragment that is comprised in the extent.

5. The recording medium according to claim 1,
   wherein the integer number of ECC-blocks in the extent with the minimum size can be divided by 3 and by 8.

6. The recording medium according to claim 5,
   wherein the minimum size of the extent is 192 ECC-blocks.

7. A recording medium comprising:
   at least one record track; and
   a recording area divided into a first fragment and a second fragment for recording an extent, the first fragment and the second fragment each having a fixed size of an integer number of ECC-blocks, a fragment begin and a fragment end, and the extent having a minimum size and an extent begin and an extend end, wherein a number of allowable defective ECC blocks is determined in a sliding window between the extent begin and the extent end of the extent.

8. A recording medium comprising:
   at least one record track; and
   a recording area divided into a first fragment and a second fragment for recording an extent, the first fragment and the second fragment each having a fixed size of an integer number of ECC-blocks, a fragment begin and a fragment end, and the extent having a minimum size and an extent begin and an extend end, wherein a number of allowable defective ECC blocks in concatenated extents is determined in a sliding window between a begin and an end of the concatenated extents.

9. A recording medium comprising:
   at least one record track; and
   a recording area divided into a first fragment and a second fragment for recording an extent, the first fragment and the second fragment each having a fixed size of an integer number of ECC-blocks, a fragment begin and a fragment end, and the extent having a minimum size and an extent begin and an extend end, wherein a number of bursts of defective ECC blocks in a window with a size equal to the minimum size of the extent is less than 4 and a number of non-used ECC blocks in a burst of defective ECC blocks is less than 5.

10. An apparatus comprising:
    a reader for playing from a recording medium; and
    a recorder for recording on said recording medium in a recording track having a recording area divided into a first fragment and a second fragment for recording an extent,
    wherein the first fragment and the second fragment each fragment has a fixed size of an integer number of ECC-blocks, a fragment begin and a fragment end, and the extent has a minimum size and an extent begin and an extent end, and
    wherein the fixed size equals the minimum size of the extent.

11. The apparatus according to claim 10
    wherein the extent begin of the extent is aligned with the fragment begin and that the extent end of the extent is aligned with the fragment end.

12. The apparatus according to claim 10,
    wherein the extent comprises a number of allowable detective ECC blocks and wherein the minimum size of the extent is determined based on the number of allowable defective ECC blocks.

13. The apparatus according to claim 12,
    wherein the number of allowable defective ECC blocks is comprised in a section of a fragment where the section is the only section in that fragment that is comprised in the extent.

14. The apparatus according to claim 10,
    wherein the integer number of ECC-blocks in the extent with the minimum size can be divided by 3 and by 8.

15. The apparatus according to claim 14,
    wherein the minimum size of the extent is 192 ECC-blocks.

16. An apparatus comprising:
    a reader for playing from a recording medium; and
    a recorder for recording on said recording medium in a recording track having a recording area divided into fragments for recording an extent,
    wherein each fragment has a fixed size of an integer number of ECC-blocks, a fragment begin and a fragment end, and the extent has a minimum size and an extent begin and an extent end; and
    wherein a number of allowable defective ECC blocks is determined in a sliding window between the extent begin and the extent end of the extent.

17. An apparatus comprising:
    a reader for playing from a recording medium; and
    a recorder for recording on said recording medium in a recording track having a recording area divided into fragments for recording an extent,
    wherein each fragment has a fixed size of an integer number of ECC-blocks, a fragment begin and a fragment end, and the extent has a minimum size and an extent begin and an extent end; and
    wherein a number of allowable defective ECC blocks in concatenated extents is determined in a sliding window between a begin and an end of the concatenated extents.

18. An apparatus comprising:
    a reader for playing from a recording medium; and
    a recorder for recording on said recording medium in a recording track having a recording area divided into fragments for recording an extent,
    wherein each fragment has a fixed size of an integer number of ECC-blocks, a fragment begin and a fragment end, and the extent has a minimum size and an extent begin and an extent end; and
    wherein a number of bursts of defective ECC blocks is less than 4 and a number of non-used ECC blocks in a burst of defect ECC blocks is less than 5.

19. A method for allocation management of a recording medium having at least one record track and having a recording area comprising a logical space divided into fragments for recording an extent, each fragment having a fixed size of an integer number of ECC-blocks, a fragment begin and a fragment end, and the extent having a minimum size and an extent begin and an extent end, the method comprising the acts of:
determining a number of defective ECC blocks in extent;
determining the minimum size for the extent based on the number of defective ECC blocks in the extent, wherein the fixed size equals the minimum size of the extent;
comparing the minimum size for the extent with an available section of the recording area for the extent; and
discarding the available section of recording area for the extent if the minimum extent is larger than the available section of the recording area for the extent.

20. The method of claim 19,
wherein the act of determining the number of defective ECC blocks comprises the acts of:
selecting a section of the logical space in a fragment delimited by the extent; and
determining the number of defective ECC blocks in the selected section.

21. A method for allocation management of a recording medium having at least one record track and having a recording area comprising a logical space divided into fragments for recording an extent, each fragment having a fixed size of an integer number of ECC-blocks, a fragment begin and a fragment end, and the extent having a minimum size and an extent begin and an extent end, the method comprising the acts of:
determining a number of defective ECC blocks in extent;
determining the minimum size for the extent based on the number of defective ECC blocks in the extent;
comparing the minimum size for the extent with an available section of the recording area for the extent; and
discarding the available section of recording area for the extent if the minimum extent is larger than the available section of the recording area for the extent;
wherein the act of determining the number of defective ECC blocks in an extent comprises the acts of:
sliding a window delimiting a section of the logical space from the extent begin of the extent to the extent end of the extent; and
determining the number of defect ECC blocks in the section of the logical space delimited by the window for each position of the window.

22. A method for allocation management of a recording medium having at least one record track and having a recording area comprising a logical space divided into fragments for recording an extent, each fragment having a fixed size of an integer number of ECC-blocks, a fragment begin and a fragment end, and the extent having a minimum size and an extent begin and an extent end, the method comprising the acts of:
determining a number of defective ECC blocks in extent;
determining the minimum size for the extent based on the number of defective ECC blocks in the extent;
comparing the minimum size for the extent with an available section of the recording area for the extent; and
discarding the available section of recording area for the extent if the minimum extent is larger than the available section of the recording area for the extent;
wherein the act of determining the number of defective ECC blocks in concatenated extents comprises the acts of:
sliding a window delimiting a section of the logical space from a beginning of a first extent to an end of a last extent; and
determining the number of defect ECC blocks in the section of the logical space delimited by the window for each position of the window.

23. A recording medium comprising:
at least one record track; and
a recording area divided into a first ECC block and a second ECC block for recording an extent, the extent having a minimum size and a begin and an end,
wherein the extent comprises a number of allowable defective ECC blocks; and
wherein the minimum size of the extent is determined based on the number of allowable defective ECC blocks and is equal to at least one of the first ECC block and the second ECC block.

24. The recording medium according to claim 23,
wherein an integer number of ECC-blocks in an extent with the minimum size can be divided by 3 and by 8.

25. The recording medium according to claim 24,
wherein the minimum size of the extent is 192 ECC-blocks.

26. A recording medium comprising:
at least one record track; and
a recording area divided into a first ECC block and a second FCC block for recording an extent, the extent having a minimum size and a begin and an end,
wherein the extent comprises a number of allowable defective ECC blocks;
wherein the minimum size of the extent is determined based on the number of allowable defective ECC blocks; and
wherein the number of allowable defective ECC blocks is determined in a sliding window between the begin and the end of the extent.

27. A recording medium comprising:
at least one record track; and
a recording area divided into a first ECC block and a second ECC block for recording an extent, the extent having a minimum size and a begin and an end,
wherein the extent comprises a number of allowable defective ECC blocks;
wherein the minimum size of the extent is determined based on the number of allowable defective ECC blocks; and
wherein the number of allowable defective ECC blocks in concatenated extents are comprised in a sliding window between a begin and an end of the concatenated extents.

28. A recording medium comprising:
at least one record track; and
a recording area divided into a first ECC block and a second ECC block for recording an extent, the extent having a minimum size and a begin and an end,
wherein the extent comprises a number of allowable defective ECC blocks;
wherein the minimum size of the extent is determined based on the number of allowable defective ECC blocks; and
wherein a number of bursts of defective FCC blocks in each window equal to the minimum size of the extent is less than 4 and a number of non-used FCC blocks in a burst of defective FCC blocks is less than 5.

* * * * *